US012459827B2

(12) United States Patent
    Watanabe

(10) Patent No.: US 12,459,827 B2
(45) Date of Patent: **\*Nov. 4, 2025**

(54) METHOD FOR PRODUCING SPHERICAL SILICA PARTICLES

(71) Applicant: ADMATECHS CO., LTD., Miyoshi (JP)

(72) Inventor: Yusuke Watanabe, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/063,744

(22) Filed: Feb. 26, 2025

(65) Prior Publication Data
    US 2025/0197226 A1    Jun. 19, 2025

Related U.S. Application Data

(63) Continuation of application No. PCT/JP2022/032669, filed on Aug. 30, 2022.

(51) Int. Cl.
    *C01B 33/18*    (2006.01)
    *C01B 33/187*   (2006.01)

(52) U.S. Cl.
    CPC .......... *C01B 33/18* (2013.01); *C01B 33/187* (2013.01); *C01P 2004/03* (2013.01); *C01P 2004/34* (2013.01)

(58) Field of Classification Search
    None
    See application file for complete search history.

(56) References Cited

U.S. PATENT DOCUMENTS 3,208,823 A  *  9/1965  Frankle ............... C08K 3/36
                                              106/482
9,272,915 B2    3/2016  Doshita et al.
                (Continued)

FOREIGN PATENT DOCUMENTS

CN   1800012 A       7/2006
JP   2006027985 A    2/2006
                (Continued)

OTHER PUBLICATIONS

Machine Translation of KR-20220061683 (Year: 2022).*
                (Continued)

*Primary Examiner* — Michael Forrest
(74) *Attorney, Agent, or Firm* — Element IP, PLC

(57) ABSTRACT

A method for producing spherical silica particles according to the present disclosure includes: a raw material silica particle preparation step of preparing a liquid dispersion of raw material silica particles from a raw material solution obtained by dissolving silicic acid in a mixed solvent of water and an organic solvent in the presence of a basic substance; and a heating step of heating the liquid dispersion or the raw material silica particles so as to remove an organic substance contained in the liquid dispersion, thereby preparing spherical silica particles. The mixed solvent has a relative permittivity of 21 or higher and 40 or lower, and a quaternary ammonium derived from the basic substance is blended in a blending ratio of 0.3 or higher and 0.8 or lower in terms of molar ratio with respect to a silicon element derived from the silicic acid.

7 Claims, 12 Drawing Sheets

Sample 3

(56) References Cited

U.S. PATENT DOCUMENTS

| | | |
|---|---|---|
| 9,656,874 B2 | 5/2017 | Doshita et al. |
| 2013/0288055 A1 | 10/2013 | Doshita et al. |
| 2013/0289133 A1 | 10/2013 | Doshita et al. |

FOREIGN PATENT DOCUMENTS

| | | | | | |
|---|---|---|---|---|---|
| JP | 2007153671 A | | 6/2007 | | |
| JP | 2021195275 A | | 12/2021 | | |
| KR | 20220061683 A | * | 5/2022 | ............... | C09G 1/02 |
| WO | WO-2012096172 A1 | | 7/2012 | | |

OTHER PUBLICATIONS

International Search Report issued Oct. 25, 2022 in PCT/JP2022/032669 (with English translation), 5 pages.

Written Opinion issued Oct. 25, 2022 in PCT/JP2022/032669 (with English translation), 6 pages.

* cited by examiner

Sample 3

Sample 6

Sample 8

Sample 10

Sample 11

FUG. 7

Sample 12

Sample 14

Sample 17

Sample 18

Sample 19

Sample 20

METHOD FOR PRODUCING SPHERICAL SILICA PARTICLES

CROSS REFERENCE TO RELATED APPLICATIONS

The present application is a Continuation Application of International Application No. PCT/JP2022/032669, filed on Aug. 30, 2022, which is incorporated herein by reference.

TECHNICAL FIELD

The present disclosure relates to a method for producing spherical silica particles and specifically relates to a method for producing spherical silica particles through a so-called wet synthesis method.

BACKGROUND ART

Examples of a method for producing silica particles each having a high sphericity include melting methods, gas-phase synthesis methods, and wet synthesis methods. Among these methods, the wet synthesis methods represented by the Stöber method are characterized by resulting in generation of few coarse particles, but leads to a high uniformity among particle diameters and a low resin filling ability.

In addition, among raw materials for use in the Stöber method, tetraethoxysilane (TEOS) itself is expensive, and, in particular, high-purity TEOS that leads to further increase in cost is required for obtaining high-purity spherical silica particles.

As a method for obtaining spherical porous silica, an emulsion synthesis method in which sodium silicate is used as a raw material is also performed. However, the emulsion synthesis method has a problem in that the amount of the sodium contained in the raw material is large, and thus cost increases when rinsing is performed to decrease the amount.

CITATION LIST

Patent Literature

Patent Literature 1: JP2021-195275 (A)

SUMMARY OF INVENTION

Technical Problem

The present disclosure has been made in view of the above circumstances, and an object of the present disclosure is to provide a novel method for producing spherical silica particles.

Solution to Problem

The present inventors conducted thorough studies in order to achieve the above object. As a result, the present inventors have found that spherical silica particles are produced by using an alkaline aqueous solution of silicic acid (hereinafter, "alkaline silicic acid aqueous solution") as a raw material. The present inventors have completed the following invention on the basis of this finding.

That is, a method for producing spherical silica particles according to the present disclosure includes:
 a raw material silica particle preparation step of preparing a liquid dispersion of raw material silica particles from a raw material solution obtained by dissolving silicic acid in a mixed solvent of water and an organic solvent in the presence of a basic substance formed from at least one of a quaternary ammonium and a base having a cyclic amidine structure; and
 a heating step of heating the liquid dispersion or the raw material silica particles obtained from the liquid dispersion through solid-liquid separation so as to remove an organic substance contained in the liquid dispersion, thereby preparing spherical silica particles. The mixed solvent has a relative permittivity of 21 or higher and 40 or lower, and a quaternary ammonium derived from the basic substance is blended in a blending ratio of 0.3 or higher and 0.8 or lower in terms of molar ratio with respect to a silicon element derived from the silicic acid.

Advantageous Effects of Invention

An alkaline silicic acid aqueous solution is prepared from a material such as a metal silicon, silica, or TEOS, and, in particular, spherical silica particles are produced from a material that is less expensive than TEOS in many cases, such as a metal silicon or silica. In addition, as these materials, high-purity materials are easily obtained, and, also regarding the spherical silica particles to be produced, the purity thereof is easily improved. Furthermore, a particle size distribution of the spherical silica particles to be obtained is controlled according to a reaction condition, and spherical silica particles having excellent filling ability are produced.

DESCRIPTION OF EMBODIMENTS

Figure 1:
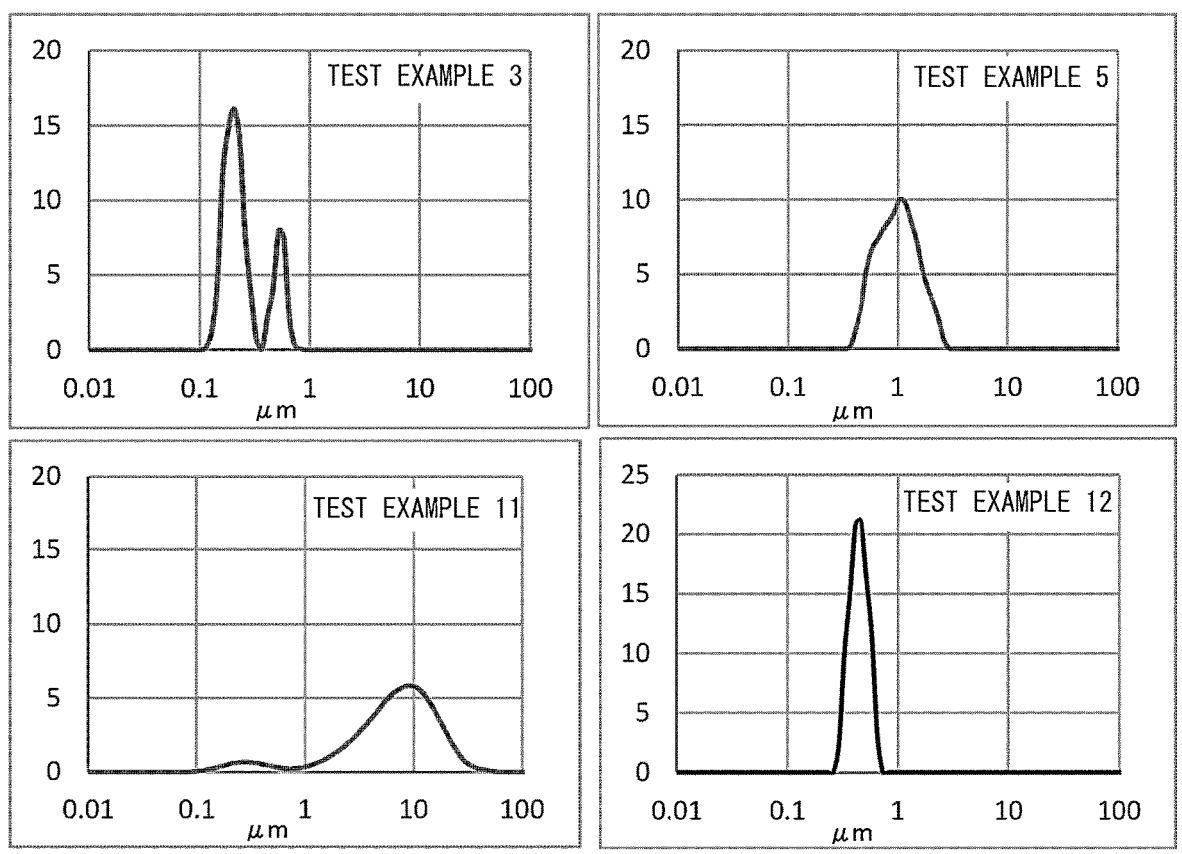
FIG. 1 shows histograms indicating particle size distributions of test samples in Test Examples 3, 5, 11, and 12 among Examples.
Figure 2:
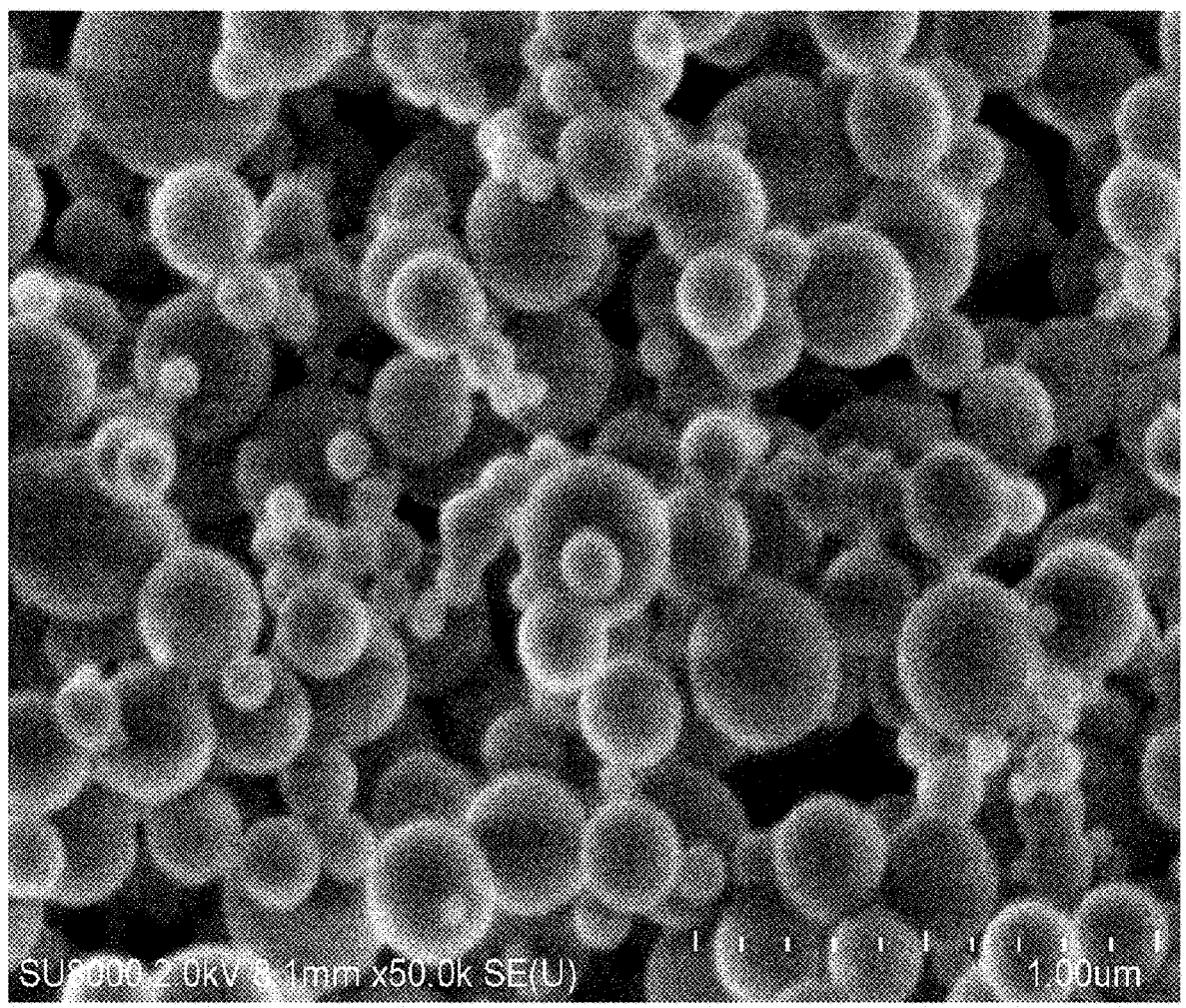
FIG. 2 is an SEM photograph of the test sample in Test Example 3 among the Examples.
Figure 3:
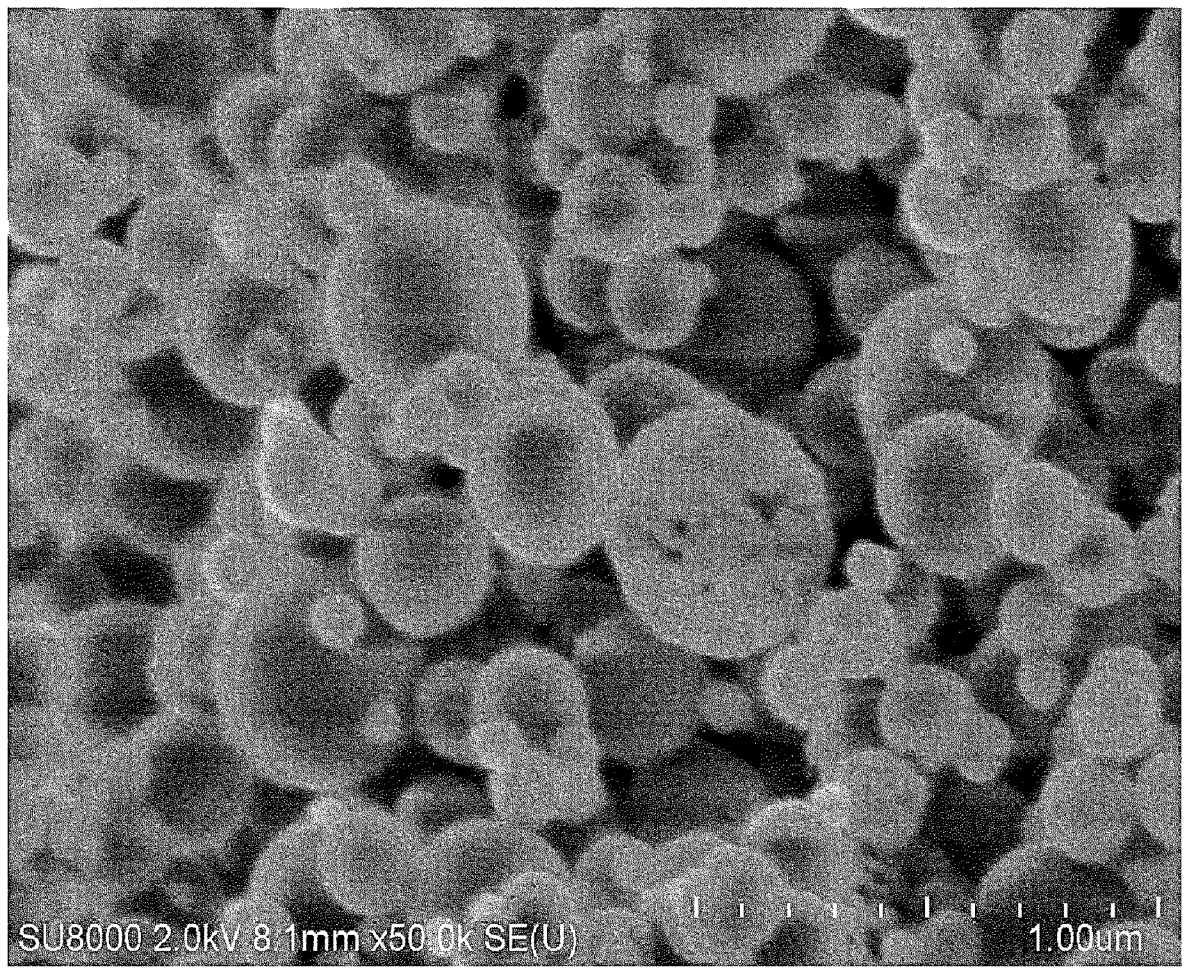
FIG. 3 is an SEM photograph of a test sample in Test Example 6 among the Examples.
Figure 4:
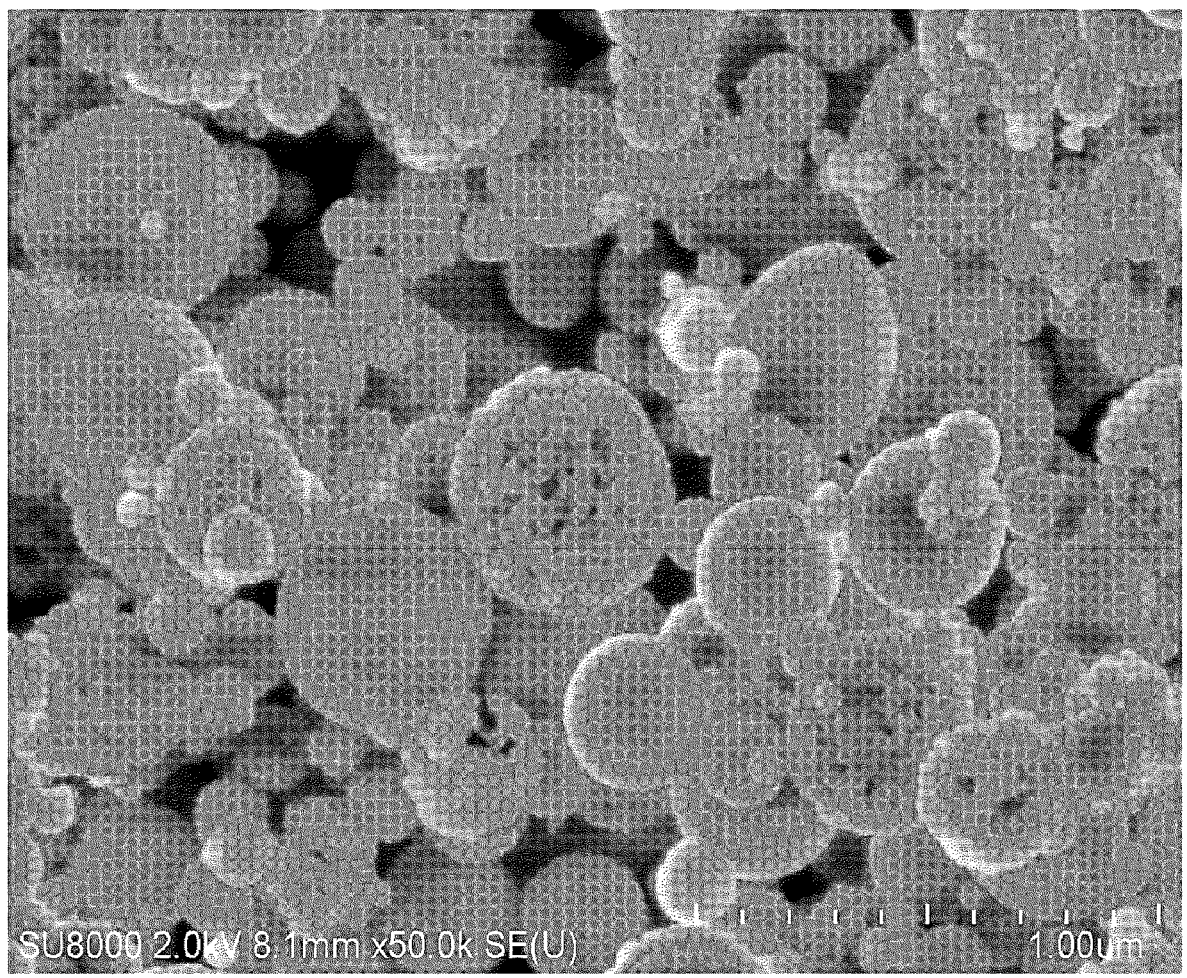
FIG. 4 is an SEM photograph of a test sample in Test Example 8 among the Examples.
Figure 5:
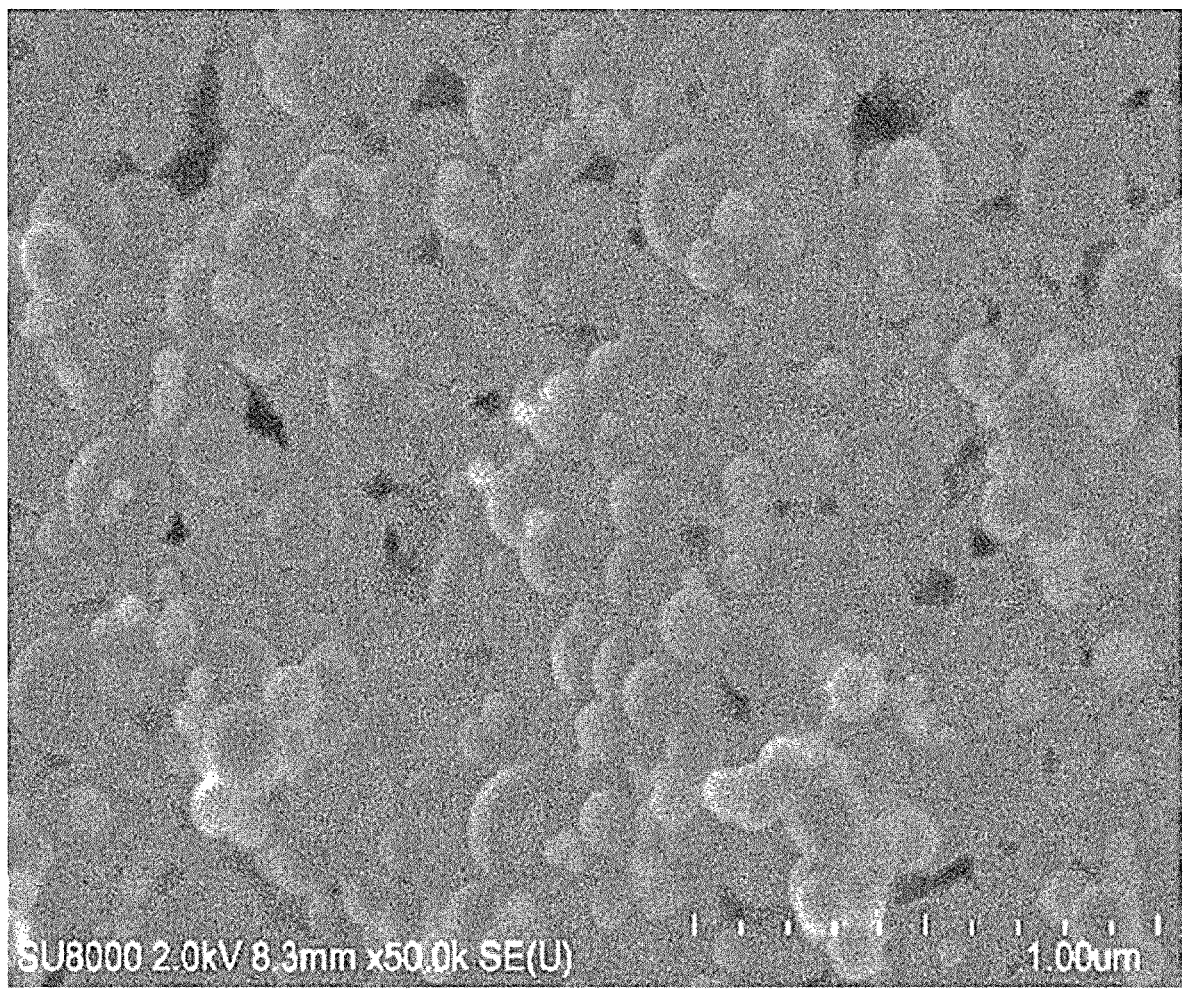
FIG. 5 is an SEM photograph of a test sample in Test Example 10 among the Examples.
Figure 6:
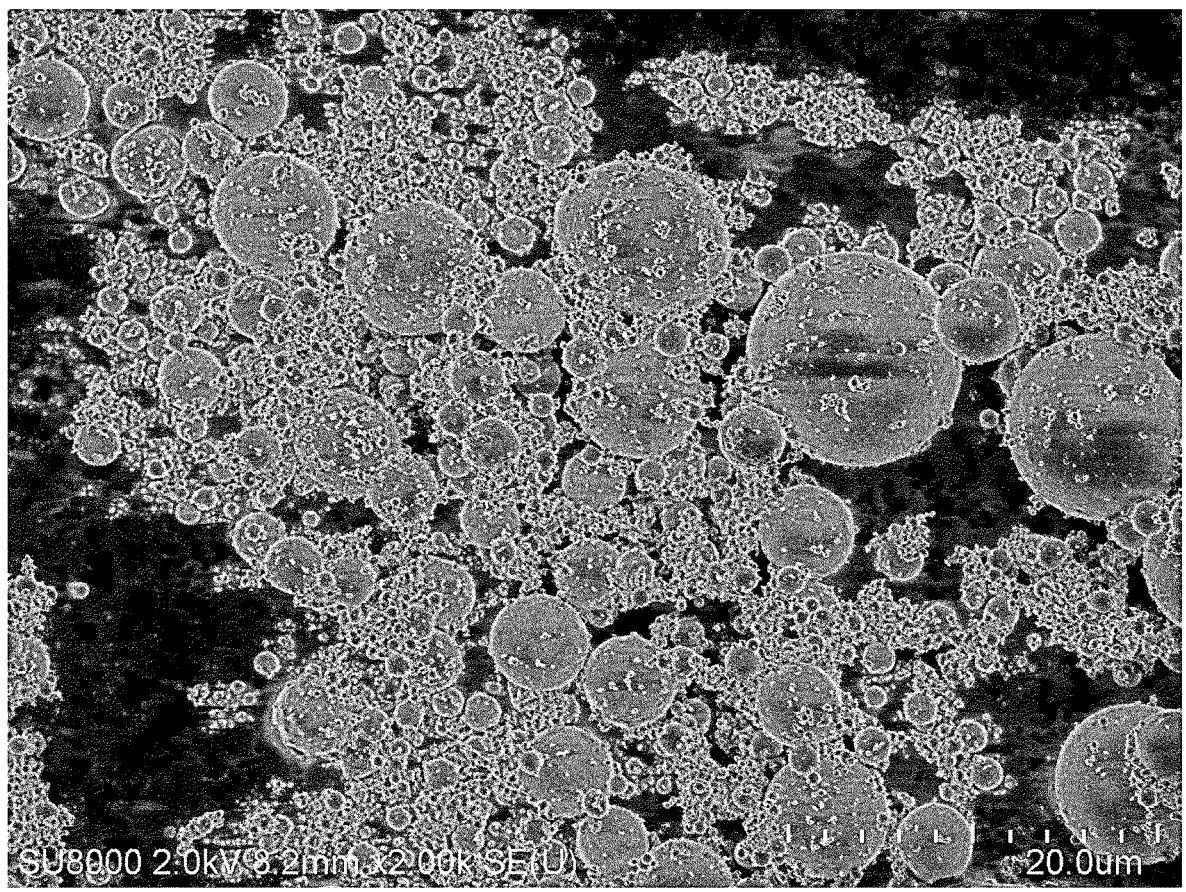
FIG. 6 is a cross-sectional SEM photograph of the test sample in Test Example 11 among the Examples.
Figure 7:
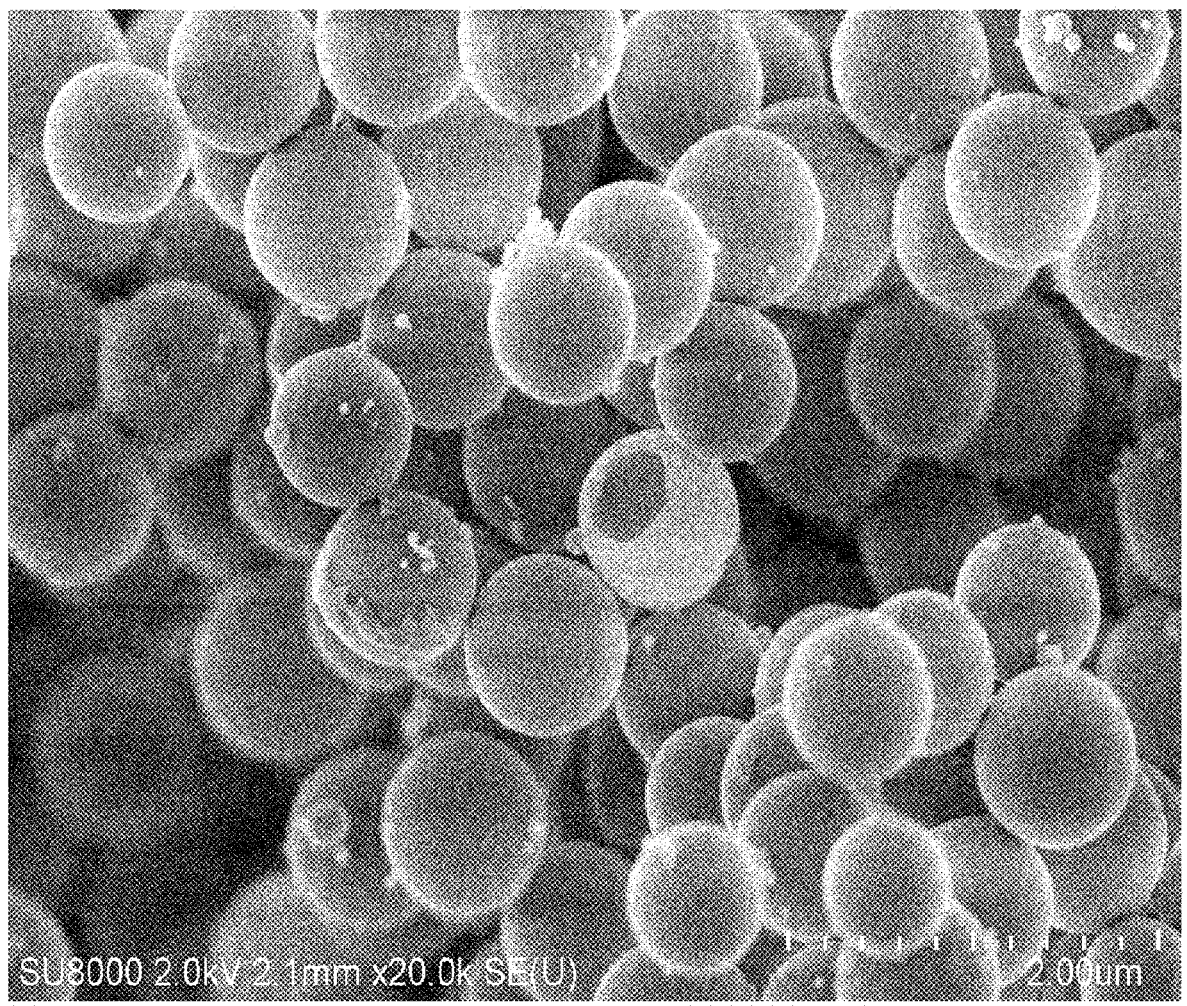
FIG. 7 is an SEM photograph of the test sample in Test Example 12 among the Examples.

A method for producing spherical silica particles according to the present disclosure will be described in detail on the basis of the following embodiment. Spherical silica particles produced through the method for producing spherical silica particles according to the present embodiment are particles that each have a high sphericity and that are formed from silica. The spherical silica particles according to the present embodiment may be formed into a slurry composition by being dispersed in a dispersion medium or may be formed into a resin composition by being dispersed in a resin material. The slurry composition and the resin composition are preferably used as materials for electronic devices, such as substrate materials, sealing materials, or underfill.

The spherical silica particles according to the present embodiment are suitably produced so as to have particle diameters of about 100 nm to 10 μm. The sphericity of each of the spherical silica particles is not particularly limited, but is preferably 0.9 or higher and further preferably 0.95 or higher.

Each of the spherical silica particles may be solid or hollow. Here, the spherical silica particle being solid means that the density of the particle is 2.3 g/cm$^3$ or higher, and the spherical silica particle being hollow means that the density of the particle is lower than 2.3 g/cm$^3$. In measurement of the density of the particle, the volume of the particle is measured by using nitrogen through a constant volume expansion method. A volume with inclusion of voids that do not allow entry of nitrogen gas is measured, and a spherical silica particle having such voids so that the density of the particle has become lower than 2.3 g/cm$^3$ is regarded as a hollow particle. The number of the voids existing inside the particle may be one or may be two or more. Also, in a case where the particle has a so-called porous structure having a large number of very fine voids formed therein such that the voids cannot be observed even with an electron microscope or the like, the particle is regarded as a hollow particle.

The method for producing the spherical silica particles according to the present embodiment includes a raw material silica particle preparation step, a heating step, and other steps employed as necessary.

(Raw Material Silica Particle Preparation Step)

The raw material silica particle preparation step is a step of precipitating raw material silica particles, from which the spherical silica particles are to be obtained, in a mixed solvent of water and an organic solvent from silicic acid contained in a raw material solution in the presence of a basic substance so as to obtain a liquid dispersion. The precipitated raw material silica particles are substantially identical to the spherical silica particles to be produced, but have a high water content, a high organic substance content, and the like.

The precipitation of the raw material silica particles is preferably performed while stirring is being performed. The temperature at the time of the precipitation is not particularly limited, examples of the lower limit value of the temperature include 0° C., and examples of the upper limit value of the temperature include 40° C., 50° C., and 60° C.

The concentration of the silicic acid in the raw material solution is not particularly limited. With the mass of the entirety being regarded as a reference, examples of the lower limit value of the concentration include 1%, 2%, 3%, and 5% on an oxide (SiO$_2$: silica) basis, and examples of the upper limit value of the concentration include 8%, 10%, 15%, and 17% on an oxide (SiO$_2$: silica) basis. In order to obtain a necessary concentration, the raw material solution may be diluted with water, the organic solvent, or the mixed solvent of water and the organic solvent. Here, said oxide basis is for calculating a value on the assumption that all silicon elements are contained in the form of the oxide. Another metal compound different from the silicic acid may be contained in the raw material solution. The other metal compound that may be contained may contain a water-soluble compound and a metal oxide having a particle diameter of 100 nm or smaller (in particular, a metal oxide having a particle diameter of 50 nm or smaller, 30 nm or smaller, or 10 nm or smaller). When the silicic acid is precipitated so as to turn into particles, the other metal oxide is taken in to form a composite oxide or the like.

The precipitation of the raw material silica particles is preferably performed in a state where adjustment to a predetermined pH is performed. The adjustment to the predetermined pH is preferably performed by adding the basic substance or adding an organic acid such as acetic acid. Examples of the lower limit value of the predetermined pH include 7.0, 7.5, and 7.8, and examples of the upper limit value of the predetermined pH include 10.0, 9.5, 9.0, 8.5, and 8.2.

Here, the mixed solvent has a relative permittivity of 21 or higher and 40 or lower. The upper limit value of the relative permittivity may be set to 38, 35, or 33, and the lower limit value of the relative permittivity may be set to 21.5, 23, or 25. These upper limit values and these lower limit values may be arbitrarily combined. Here, the relative permittivity of the mixed solvent refers to a relative permittivity calculated with the mixed solvent being formed from only the contained water and organic solvent. Specifically, the relative permittivity of the mixed solvent is obtained by using a weighted average in terms of a volume ratio on the basis of the relative permittivity of the water and the relative permittivity of the mixed organic solvent.

The organic solvent is a solvent that is mixable with water and with which the relative permittivity falls within the above range after the mixing. Preferable examples of the organic solvent include ketones, esters, and alcohols. In particular, acetone, methyl ethyl ketone, ethyl acetate, and the like are preferably used singly or as mixture, and acetone is further preferably used. The mixing ratio between the organic solvent and the water is set such that the relative permittivity falls within the aforementioned range when the mixed solvent is obtained.

The basic substance is formed from at least one of a quaternary ammonium and a base having a cyclic amidine structure. The quaternary ammonium and the base having a cyclic amidine structure are not particularly limited, but the quaternary ammonium is preferably selected from among quaternary ammoniums each having 4 to 16 carbon atoms. Particular examples of the quaternary ammonium include tetramethylammonium having 4 carbon atoms, tetraethylammonium having 8 carbon atoms, and tetrabutylammonium having 16 carbon atoms. The quaternary ammonium typically has a certain anion as a counterion. Examples of the quaternary ammonium having a certain anion include: tetramethylammonium hydroxide (TMAH), tetraethylammonium hydroxide (TEAH), and tetrabutylammonium hydroxide (TBAOH) each having a hydroxide ion; and tetramethylammonium chloride, tetraethylammonium chloride, and tetrabutylammonium chloride each having a chloride ion. Examples of the base having a cyclic amidine structure include diazabicycloundecene (DBU) and diazabicyclononen (DBN).

With the number of moles of a silicon element derived from the silicic acid being regarded as a reference, the basic substance is contained in a ratio of 0.3 or higher and 0.8 or lower. The lower limit value of the ratio may be set to 0.35 or 0.4, and the upper limit value of the ratio may be set to 0.75, 0.7, or 0.6. These upper limit values and these lower limit values may be arbitrarily combined. By setting the addition amount of the basic substance to the lower limit value or larger, raw material silica particles having larger particle diameters are produced so that an aggregate is prevented from being formed, and raw material silica particles having a higher silica density therein are produced. By setting the addition amount to the upper limit value or smaller, formation of an oligomer is prevented, and formation of particles is efficiently performed. When the silica density becomes low, heating in the heating step described later tends to lead to shrinkage, or the spherical silica particles having been obtained tend to have a higher void proportion when being formed into porous particles or hollow particles.

The basic substance may be added into the mixed solvent before or after the silicic acid is added. Furthermore, the basic substance may be gradually added over several times instead of adding the whole amount of the basic substance at once.

The concentration of the silicic acid in the raw material solution is not particularly limited, but, on an oxide basis and with the mass of the raw material solution being regarded as a reference, the upper limit value of the concentration is preferably 0.1%, 0.2%, 0.3%, or 0.4%, and the lower limit value of the concentration is preferably 1.0%, 1.5%, 2.0%, or 3.0%. The silicic acid is preferably supplied as an alkaline silicic acid aqueous solution obtained through any of the following methods "a)" to "c)". Processes in these "a)" to "c)" are preferably performed while stirring is being performed. Appropriate amounts of the organic solvent and the basic substance are added into the alkaline silicic acid aqueous solution obtained through any of the following processes, whereby the raw material solution is prepared.

A) Heating and Pressurizing Silicon Dioxide in A Basic Substance Aqueous Solution As the silicon dioxide, silicon dioxide synthesized from a metal silicon, silicon dioxide synthesized from a silicon compound, natural silicon dioxide, or the like may be used. In particular, silicon dioxide synthesized from a metal silicon is preferable since a high-purity metal silicon is easily obtained as the metal silicon which is a raw material. For example, a particulate formed from silicon dioxide obtained through a method that involves combusting a metal silicon powder (so-called VMC method) may be used. Here, by using a particulate as the silicon dioxide, the specific surface area is increased, and the speed of dissolving the silicon dioxide in the basic substance aqueous solution is increased.

As the basic substance to be contained in the basic substance aqueous solution in which the silicon dioxide is to be dissolved, the aforementioned basic substance be directly used, or a basic substance (another basic substance) other than the aforementioned basic substance may be used. In the case of using another basic substance, the other basic substance having been used is preferably removed through rinsing or ion exchange after the silicon dioxide is dissolved.

A method for dissolving the silicon dioxide in the basic substance aqueous solution includes: performing pressurization to increase the boiling point of the basic substance aqueous solution; and keeping the basic substance aqueous solution at a temperature of not lower than a boiling point at normal pressure. For example, a condition of performing heating at 180° C. while performing pressurization may be employed. Increase in the temperature for the dissolving leads to improvement of the dissolving speed, and decrease in the temperature for the dissolving leads to decrease in pressure, whereby dissolving equipment is simplified.

With the mass of the entirety being regarded as a reference, the upper limit value of the mass of the silicon dioxide to be dissolved is preferably set to 17%, 15%, or 10%, and the lower limit value of the mass of the silicon dioxide to be dissolved is preferably set to 1%, 3%, or 5%. These upper limit values and these lower limit values may be arbitrarily combined. The concentration of the basic substance in the basic substance aqueous solution is not particularly limited but is preferably such a concentration that the basic substance eventually comes to have an appropriate concentration when the raw material solution is prepared.

B) Removing Na Ions from a Sodium Silicate Aqueous Solution in the Presence of a Basic Substance As the sodium silicate aqueous solution, a solution obtained by dissolving sodium silicate in water, i.e. water glass, may be used. As the basic substance, the above basic substance may be used. Na ions are removed from the sodium silicate aqueous solution in the presence of the basic substance, whereby the sodium of the sodium silicate is substituted with the basic substance. The removal of Na ions may be performed by using an ion exchange resin or the like.

On an oxide basis and with the mass of the entirety being regarded as a reference, the upper limit value of the mass of the sodium silicate to be dissolved is preferably set to 17%, 15%, or 10%, and the lower limit value of the mass of the sodium silicate to be dissolved is preferably set to 1%, 3%, or 5%. These upper limit values and these lower limit values may be arbitrarily combined. The concentration of the basic substance in the basic substance aqueous solution is not particularly limited but is preferably such a concentration that the basic substance eventually comes to have an appropriate concentration when the raw material solution is prepared.

C) Dissolving a Metal Silicon in an Aqueous Solution Containing a Basic Substance and/or a Second Basic Substance A metal silicon is immersed and dissolved in an aqueous solution in which the above basic substance and/or a second basic substance has been dissolved, whereby silicic acid is generated. The metal silicon is preferably in the form of a particulate. A condition for the dissolving preferably involves heating. The temperature for the heating is not particularly limited, and the lower limit value of the temperature may be set to 30° C., 40° C., 50° C., 60° C., or the like.

On an oxide basis and with the mass of the entirety being regarded as a reference, the upper limit value of the mass of the metal silicon to be dissolved is preferably set to 17%, 15%, or 10%, and the lower limit value of the mass of the metal silicon to be dissolved is preferably set to 1%, 3%, or 5%. These upper limit values and these lower limit values may be arbitrarily combined.

The basic substance is identical to the above basic substance. The second basic substance is not particularly limited but is preferably formed from an organic substance. Examples of the second basic substance include dialkylamines (e.g., dialkylamines each having 1 to 3 carbon atoms), trialkylamines (e.g., trialkylamines each having 1 to 3 carbon atoms), and the like.

The total concentration of the basic substance and the second basic substance in the aqueous solution containing the basic substance and/or the second basic substance is not particularly limited. In the case of adding the basic substances, the total concentration is preferably such a concentration that the amount of the basic substances eventually becomes an appropriate existence amount or smaller when the raw material solution is prepared.

(Heating Step)

The heating step is a step of heating the raw material silica particles contained in the liquid dispersion obtained in the raw material silica particle preparation step, thereby obtaining spherical silica particles. Through the heating in this step, the water and the organic substance contained in the raw material silica particles are removed.

The heating in the heating step is performed in a state where: the liquid dispersion is used as is; the dispersion medium in the liquid dispersion is substituted with another dispersion medium; and/or the raw material silica particles are subjected to solid-liquid separation from the liquid dispersion. The raw material silica particles are separated from the dispersion medium through centrifugal separation or filtration. After the raw material silica particles are separated, an operation for adding another dispersion medium such as water or an organic solvent is performed, whereby the dispersion medium is substituted. The organic substance contained in the liquid dispersion is more assuredly removed by performing the substitution of the dispersion medium a plurality of times.

The heating step enables removal of the water and the organic substance contained in the raw material silica particles by performing the heating at a high temperature. First, the water and the organic solvent are preferably removed at a temperature that does not lead to rapid removal of water. The temperature is, for example, 40° C., 60° C., 80° C., 100° C., 120° C., 140° C., or the like. Decompression or air-drying may be performed simultaneously with the heating. When the water is removed to a certain extent, the water does not rapidly expand even when being heated at a high temperature, and thus heating is performed until arrival of a temperature that allows removal of the organic substance. The temperature that allows removal of the organic substance is preferably a temperature of 500° C. or higher.

In particular, execution of the heating in an oxidizing atmosphere such as air enables oxidation removal of the organic substance, and thus is preferable. The lower limit value of the temperature for the heating may be set to 600° C., 650° C., 700° C., 750° C., 800° C., 850° C., 900° C., or the like, and the upper limit value of the temperature for the heating may be set to 1150° C., 1100° C., 1050° C., or the like. Execution of the heating in a state where the raw material silica particles are separated from the dispersion medium is considered to cause the particles to shrink and become dense in association with removal of the water.

(Hydrothermal Treatment Step)

The method for producing spherical silica particles preferably further includes a hydrothermal treatment step of substituting the dispersion medium in the liquid dispersion with water, and then causing progression of a hydrothermal reaction through heating, the hydrothermal treatment step being subsequent to the raw material silica particle preparation step and preceding the heating step. The hydrothermal reaction is preferably caused at a temperature of 130° C. or higher and 250° C. or lower. In particular, the lower limit value of the temperature is preferably set to 100° C., 110° C., or 120° C., and the upper limit value of the temperature is preferably set to 220° C., 200° C., or 180° C. These upper limit values and these lower limit values may be arbitrarily combined.

The causation of the hydrothermal reaction also enables the spherical silica particles to be eventually produced as hollow particles or porous particles. That is, the hydrothermal treatment step is inferred to lead to occurrence, in a balanced manner, of a reaction in which a portion having a low silanol bond density inside the particles is dissolved by the basic substance and a reaction in which the outer shells of the particles become dense owing to heat, so that hollow particles or porous particles are generated by the balance between the two reactions.

In the case of performing the hydrothermal treatment step, the raw material silica particles are separated from the dispersion medium afterward, and then the heating is performed as described above so as to remove the organic substance. In a case where the hydrothermal reaction has been performed, heating to 900° C. or higher is particularly preferably performed in the heating step so that the hollow particles or the porous particles become firm.

(Other Steps)

The method for producing spherical silica particles according to the present embodiment may further include crushing, or performing surface treatment on, the obtained spherical particles. The crushing is performed by a means similar to a means for an ordinary pulverization operation. In particular, a jet mill or the like is preferably used.

The spherical silica particles produced through the method for producing spherical silica particles according to the present embodiment may be subjected to surface treatment with a surface treatment agent such as a silane compound. Appropriate surface treatment varies according to the manner in which the spherical silica particles are used. In a case where a resin is filled with the spherical silica particles, a surface treatment agent allowing introduction of a functional group having high affinity for or reactivity with the resin is preferably used.

EXAMPLES

The method for producing spherical silica particles according to the present disclosure will be described in detail on the basis of the following Examples.

<Preparation of Samples>

Test samples in respective Test Examples were prepared under conditions indicated in Table 1. Hereinafter, description will be given in detail.

Test Example 1

(Raw Material Silica Particle Preparation Step)

First, an alkaline silicic acid aqueous solution was prepared. 9.0 g of a metal silicon powder (volume-average particle diameter: 20 μm), 27.0 g of ion exchanged water, and 64.0 g of a 25%-by-mass TMAH aqueous solution were mixed, and the mixture was retained at 40° C. for 48 hours so as to dissolve the metal silicon. Consequently, an alkaline silicic acid aqueous solution containing about 26.3% of silicic acid on a silica basis was obtained.

Ion exchanged water was added to the obtained alkaline silicic acid aqueous solution such that the concentration of the silicic acid became 4.5% by mass on a silica basis. The addition was performed such that the existence amount of the TMAH as a basic substance became 0.44 in terms of molar ratio as a whole with a silicon element derived from the contained silicic acid being regarded as a reference. Thereafter, acetone as an organic solvent was added such that a value of 30.6 was obtained when the acetone was mixed with the contained water. Specifically, the mass ratio of the water to the acetone was 20:80 before the mixing.

After stirring was sufficiently performed, a 90%-by-mass acetic acid aqueous solution was added to adjust the pH to 8, and stirring was further performed for 30 minutes. Consequently, raw material silica particles were precipitated, whereby a liquid dispersion was obtained.

(Heating Step)

The obtained liquid dispersion was subjected to centrifugal separation at 5000 rpm for 5 minutes, and the supernatant was removed through decantation, whereby the precipitate was separated. The centrifugal separation was performed by using Model 3700 manufactured by KUBOTA Corporation. Ion exchanged water was added in a mass equal to the mass of the removed supernatant, and ultrasonic dispersion was performed. The ultrasonic dispersion was performed at 1000 W for 30 minutes with the frequency of an ultrasonic wave being 28 KHz. Centrifugal separation was performed again under the above conditions, and the obtained precipitate was dried at 130° C. for 1 hour, and then, fired at 500° C. for 2 hours. The obtained fired product was crushed by using a mortar until aggregates became visually unrecognizable, to obtain spherical silica particles which were then used as a test sample in this Test Example.

Test Examples 2 and 3

The same operations as the operations in Test Example 1 were performed, except that the firing temperatures were set to 800° C. (Test Example 2) and 1000° C. (Test Example 3). Consequently, test samples in these Test Examples were obtained.

Test Examples 4 and 5

The same operations as the operations in Test Example 1 were performed, except that: a) the existence amount of the basic substance was set to 0.55 in terms of molar ratio with the silicon element derived from the silicic acid being regarded as a reference; b) the liquid dispersion obtained through ultrasonic dispersion after the first time of centrifugal separation in the heating step was put into a pressure container, and then, subjected to hydrothermal treatment step involving a hydrothermal reaction at 175° C. for 2 hours; and c) the firing temperatures were set to 800° C. (Test Example 4) and 1000° C. (Test Example 5). Consequently, test samples in these Test Examples were obtained.

Test Examples 6 to 9

The same operations as the operations in Test Example 5 were performed except for the following differences. Consequently, test samples in these Test Examples were obtained.
a) Each of the existence amounts of the basic substance was set to 0.44 in terms of molar ratio with the silicon element derived from the silicic acid being regarded as a reference. b) The pH was set to 6 (Test Example 6). The pH was set to 6, and the temperature at the time of a hydrothermal reaction was set to 200° C. (Test Example 7). Only the change recited in "a)" was made (Test Example 8). The pH was set to 6, and the temperature at the time of a hydrothermal reaction was set to 121° C. (Test Example 9).

Test Examples 10 and 11

The same operations as the operations in Test Example 3 were performed, except that the existence amounts of the basic substance were set to 0.35 (Test Example 10) and 0.79 (Test Example 11) in terms of molar ratio with the silicon element derived from the silicic acid being regarded as a reference. Consequently, test samples in these Test Examples were obtained.

Test Example 12

(Corresponding to Raw Material Silica Particle Preparation Step)
A liquid mixture formed from 5.2 g of TEOS, 100 g of ion exchanged water, and 400 g of acetone was prepared. 2.5 g of a 25%-by-mass TMAH aqueous solution was added to the liquid mixture while stirring was being performed. Thereafter, a 90%-by-mass acetic acid aqueous solution was swiftly added to adjust the pH to 8, and stirring was further performed for 30 minutes. Consequently, raw material silica particles were precipitated, whereby a liquid dispersion was obtained. Here, the ratio between the ion exchanged water and the acetone was set such that the relative permittivity became 30.6. The addition amount of the TMAH was set to 0.27 in terms of molar ratio with a silicon element derived from silicic acid derived from the TEOS being regarded as a reference.
(Corresponding to Heating Step)
The obtained liquid dispersion was subjected to centrifugal separation at 5000 rpm for 5 minutes, and the supernatant was removed through decantation, whereby the precipitate was separated. The centrifugal separation was performed by using Model 3700 manufactured by KUBOTA Corporation. Ion exchanged water was added in a mass equal to the mass of the removed supernatant, and ultrasonic dispersion was performed. The ultrasonic dispersion was performed at 1000 W for 30 minutes with the frequency of an ultrasonic wave being 28 kHz.
The obtained liquid dispersion was put into a pressure container, and then, subjected to a hydrothermal reaction at 175° C. for 2 hours. Then, centrifugal separation was further performed again under the above conditions, and the obtained precipitate was dried at 130° C. for 1 hour, and then, fired at 1000° C. for 2 hours. The obtained fired product was crushed by using a mortar until aggregates became visually unrecognizable, to obtain spherical silica particles which were then used as a test sample in this Test Example.

Test Example 13

The same operations as the operations in Test Example 3 were performed, except that the content of the acetone was such an amount that a value of 20 was obtained when the acetone was mixed with the contained water. As a result, generation of particles was not observed in the step corresponding to the raw material silica particle preparation step, and the heating step was not performed. Therefore, no test sample was obtained in this Test Example.

Test Example 14

The same operations as the operations in Test Example 3 were performed, except that the content of the acetone was such an amount that a value of 41.5 was obtained when the acetone was mixed with the contained water. Consequently, a test sample in this Test Example was obtained.

Test Example 15

The same operations as the operations in Test Example 1 were performed, except that the existence amount of the basic substance was set to 0.20 in terms of molar ratio with the silicon element derived from the silicic acid being regarded as a reference. Consequently, a test sample in this Test Example was obtained.

Test Example 16

The same operations as the operations in Test Example 1 were performed, except that the existence amount of the basic substance was set to 0.85 in terms of molar ratio with the silicon element derived from the silicic acid being regarded as a reference. As a result, generation of particles was not observed in the step corresponding to the raw material silica particle preparation step, and the heating step was not performed. Therefore, no test sample was obtained in this Test Example.

Test Examples 17 and 18

The same operations as the operations in Test Example 5 were performed, except that DBU (Test Example 17) and DBN (Test Example 18) were used as basic substances instead of TMAH. Consequently, test samples in these Test Examples were obtained. The addition amounts of the DBU and the DBN were each set to be equal to the addition amount of the TMAH. As a result, the addition amount of each of the DBU and the DBN was set such that the existence amount of the basic substance became 0.41 in terms of molar ratio with the silicon element derived from the silicic acid being regarded as a reference.

Test Examples 19 and 20

The same operations as the operations in Test Example 3 were performed, except that TEAH (Test Example 19) and TBAOH (Test Example 20) were used as basic substances instead of TMAH. Consequently, test samples in these Test Examples were obtained. The addition amounts of the TEAH and the TBAOH were each set to be equal to the concentration of the TMAH. As a result, the addition amount of each of the TEAH and the TBAOH was set such that the existence amount of the basic substance became 0.32 (Test Example 19) or 0.35 (Test Example 20) in terms of molar ratio with the silicon element derived from the silicic acid being regarded as a reference.

Test Example 21

By using the metal silicon powder used as a raw material for producing the alkaline silicic acid aqueous solution in the raw material silica particle preparation step for Test Example 1, spherical silica particles were prepared through a VMC method and used as a test sample in this Test Example. The VMC method is a method for producing spherical silica particles by deflagrating a metal silicon powder in a state where the metal silicon powder is caused to float in air.

(Evaluation)

For each of the test samples in the respective Test Examples, a particle size distribution, a specific surface area, a pore volume, a true specific gravity, the number of coarse particles, and contents of impurities were measured. The results are indicated in Tables 1 and 2.

Particle size distribution: Each of the test samples was dispersed in water so as to have a concentration of 0.5% by mass, and a particle size distribution was measured by using a particle diameter distribution measurement device (SALD-7500nano manufactured by Shimadzu Corporation). For Test Examples 3, 5, 11, and 12, histograms of the respective measured particle size distributions are shown in FIG. 1.

Specific surface area and pore volume: Each of the test samples was subjected to measurement by using an automatic specific surface area/pore distribution measurement device (TriStar 3000 manufactured by Shimadzu Corporation). The specific surface area was measured through a BET single point method by using nitrogen gas. As the pore volume, a value at the time of attraction measured through a BJH method was used.

True specific gravity: Measurement was performed with nitrogen gas by using a dry automatic densimeter (AccuPycII 1345 manufactured by Shimadzu Corporation). A density was measured by using a particle volume with inclusion of voids that did not allow entry of nitrogen gas and that were inside the spherical silica particles. This measurement is based on the fact that existence of voids leads to decrease in the density of the spherical silica particles according to the volume of the voids.

Number of coarse particles: For each of the test samples in Test Examples 3, 5, and 21, the number of particles contained per gram and having particle diameters of 3 μm or larger was measured by using an automatic flow-type particle imaging analyzer (FPIA-3000 manufactured by Sysmex Corporation).

Contents of impurities: For each of the test samples in Test Examples 5 and 21, contents of impurities were measured through ICP after the test sample was dissolved in an acid.

Furthermore, for each of the test samples in Test Examples 3, 6, 8, 10 to 12, 14, and 17 to 20, an SEM photograph was taken (FIG. 2 to FIG. 12).

TABLE 1

|  | Test Example 1 | Test Example 2 | Test Example 3 | Test Example 4 | Test Example 5 |
| --- | --- | --- | --- | --- | --- |
| Si source | Silicic acid | Silicic acid | Silicic acid | Silicic acid | Silicic acid |
| Solvent permittivity | 30.6 | 30.6 | 30.6 | 30.6 | 30.6 |
| Base | TMAH | TMAH | TMAH | TMAH | TMAH |
| Base (mol)/Si (mol) | 0.44 | 0.44 | 0.44 | 0.55 | 0.55 |
| pH | 8 | 8 | 8 | 8 | 8 |
| Hydrothermal treatment | Not performed | Not performed | Not performed | 175° C. | 175° C. |
| Firing temperature (° C.) | 500° C. | 800° C. | 1000° C. | 800° C. | 1000° C. |
| Particle diameter D10 (μm) | 0.15 | 0.15 | 0.15 | 0.52 | 0.52 |
| Particle diameter D50 (μm) | 0.21 | 0.21 | 0.21 | 1 | 1 |
| Particle diameter D90 (μm) | 0.52 | 0.52 | 0.52 | 1.67 | 1.67 |
| Specific surface area | 322.3 | 95.9 | 13.5 | 23.0 | 23.0 |

TABLE 1-continued

|  | | | | | |
|---|---|---|---|---|---|
| Pore volume | 0.063 | 0.042 | 0.039 | 0.054 | 0.076 |
| True specific gravity (nitrogen) | 2.3 | 2.3 | 2.3 | 1.6 | 1.6 |
| Coarse particles (3 μm or larger) | — | — | 5 | — | 36 |

|  | Test Example 6 | Test Example 7 | Test Example 8 | Test Example 9 | Test Example 10 |
|---|---|---|---|---|---|
| Si source | Silicic acid | Silicic acid | Silicic acid | Silicic acid | Silicic acid |
| Solvent permittivity | 30.6 | 30.6 | 30.6 | 30.6 | 30.6 |
| Base | TMAH | TMAH | TMAH | TMAH | TMAH |
| Base (mol)/Si (mol) | 0.44 | 0.44 | 0.44 | 0.44 | 0.35 |
| pH | 6 | 6 | 8 | 6 | 8 |
| Hydrothermal treatment | 175° C. | 200° C. | 175° C. | 121° C. | Not performed |
| Firing temperature (° C.) | 1000° C. | 1000° C. | 1000° C. | 1000° C. | 1000° C. |
| Particle diameter D10 (μm) | 0.15 | 0.15 | 0.15 | 0.15 | 0.09 |
| Particle diameter D50 (μm) | 0.21 | 0.21 | 0.21 | 0.21 | 0.14 |
| Particle diameter D90 (μm) | 0.52 | 0.52 | 0.52 | 0.52 | 0.25 |
| Specific surface area | 22.3 | 239.6 | 224.5 | 473.7 | 42.6 |
| Pore volume | 0.066 | 0.506 | 1.122 | 0.523 | — |
| True specific gravity (nitrogen) | 1.6 | 2.3 | 2.3 | 2.3 | 2.3 |
| Coarse particles (3 μm or larger) | — | — | — | — | — |

|  | Test Example 11 | Test Example 12 | Test Example 13 | Test Example 14 | Test Example 15 |
|---|---|---|---|---|---|
| Si source | Silicic acid | TEOS | Silicic acid | Silicic acid | Silicic acid |
| Solvent permittivity | 30.6 | 30.6 | 20 | 41.5 | 30.6 |
| Base | TMAH | TMAH | TMAH | TMAH | TMAH |
| Base (mol)/Si (mol) | 0.79 | 0.27 | 0.44 | 0.44 | 0.20 |
| pH | 8 | 8 | 8 | 8 | 8 |
| Hydrothermal treatment | Not performed | 175° C. | No particle generated | No formation of spherical particles | No formation of spherical particles |
| Firing temperature (° C.) | 1000° C. | 1000° C. |  |  |  |
| Particle diameter D10 (μm) | 1.5 | 0.33 |  | — | — |
| Particle diameter D50 (μm) | 6.8 | 0.46 |  | 20< | 20< |
| Particle diameter D90 (μm) | 17.1 | 0.58 |  | — | — |
| Specific surface area | 2.3 | 7.11 |  | — | — |
| Pore volume | — | — |  | — | — |
| True specific gravity (nitrogen) | 2.3 | 1.4 |  | — | — |
| Coarse particles (3 μm or larger) | — | — |  | — | — |

|  | Test Example 16 | Test Example 17 | Test Example 18 | Test Example 19 | Test Example 20 |
|---|---|---|---|---|---|
| Si source | Silicic acid | Silicic acid | Silicic acid | Silicic acid | Silicic acid |
| Solvent permittivity | 30.6 | 30.6 | 30.6 | 25.6 | 21.7 |
| Base | TMAH | DBU | DBN | TEAH | TBAOH |
| Base (mol)/Si (mol) | 0.85 | 0.41 | 0.41 | 0.32 | 0.35 |
| pH | 8 | 8 | 8 | 8 | 8 |
| Hydrothermal treatment | No particle | 175° C. | 175° C. | Not performed | Not performed |

TABLE 1-continued

| Firing temperature (° C.) | generated | 1000° C. | 1000° C. | 1000° C. | 1000° C. |
|---|---|---|---|---|---|
| Particle diameter D10 (μm) | | 0.15 | 0.18 | 0.15 | 0.46 |
| Particle diameter D50 (μm) | | 0.21 | 0.25 | 0.41 | 0.74 |
| Particle diameter D90 (μm) | | 0.52 | 0.66 | 0.74 | 1.48 |
| Specific surface area | — | 40.1 | 25.8 | — | — |
| Pore volume | — | — | — | — | — |
| True specific gravity (nitrogen) | — | 1.6 | 1.7 | 2.3 | 2.3 |
| Coarse particles (3 μm or larger) | — | — | — | — | — |

TABLE 2

| | ICP (ppb) | | ICP | | | | | | | |
|---|---|---|---|---|---|---|---|---|---|---|---|
| | Th | U | Na | Mg | Al | P | K | Ca | Ti | Cr | Mn |
| Test Example 21 | 29 | 19 | 1 | 1 | 400 | 11 | <1 | 46 | 7 | <1 | <1 |
| Test Example 5 | 2.3 | 1 | <1 | <1 | 100 | <1 | <1 | 3 | <1 | <1 | <1 |

| | ICP | | | | | | | | | |
|---|---|---|---|---|---|---|---|---|---|---|
| | Fe | Co | Ni | Cu | Zn | As | Mo | Sb | B | V |
| Test Example 21 | 180 | <1 | <1 | <1 | <1 | 2 | <1 | <1 | — | — |
| Test Example 5 | 3 | <1 | <1 | <1 | 2 | <1 | <1 | <1 | 14 | <1 |

As is obvious from Table 1, in each of three groups which are a) Test Examples 1 to 3, b) Test Examples 4 and 5, and c) Test Examples 6 to 9, the conditions applied until the step preceding the firing, and the particle size distribution, were the same in the group, but the heating conditions applied in the subsequent heating step differed so that the value of the specific surface area differed in the group.

That is, in a case where the conditions in the raw material silica particle preparation are step the same, spherical silica particles having similar particle size distributions are obtained. The specific surface area differed owing to the differences in the temperatures at the time of heating (the temperature at the time of the hydrothermal reaction and the firing temperature) performed after removal of the dispersion medium in the subsequent processing step. The reason for the difference in the specific surface area is considered to be because a pore structure of the produced spherical silica particles (in particular, a pore structure at the surface thereof) changed.

In Test Example 12 in which the spherical silica particles were produced from TEOS, particle diameters were close to one another, and meanwhile, the test samples in Test Examples 1 to 11 and 17 to 20 in which the spherical silica particles were produced via silicic acid had broad particle size distributions. Specifically, the test sample in Test Example 12 was found to have particle diameters that were very close to one another. The fact that the particle size distribution of the particles in Test Example 12 was narrow is supported by D90/D50 being about 1.26 and the SEM photograph shown in FIG. 7.

Meanwhile, the test samples in Test Examples 1 to 11 and 17 to 20 contained particles having various particle diameters, as is known from the fact that D90/D50 in each of Test Examples 4 and 5 was 1.67 despite being lowest. In addition, as is obvious from FIG. 2 to FIG. 6 and FIG. 8 to FIG. 12, the particle diameters were not close to one another.

Therefore, regarding each of the test samples in Test Examples 1 to 11 and 17 to 20, the filling ability of the obtained spherical silica particles into a resin, slurry, or the like is expected to be improved. Regarding this fact, also from the histograms shown in FIG. 1, the test sample in Test Example 12 in which TEOS was used as a raw material was found to have particle diameters close to one another, and meanwhile, each of the test samples in Test Examples 3, 5, and 11 was found to have a variation among the particle diameters.

Silica has a specific gravity of about 2.3 g/cm$^3$. In each of Test Examples 1 to 3, 10, 11, 19, and 20 in which no hydrothermal reaction was caused, the true specific gravity was 2.3 g/cm$^3$, and voids are inferred to have been absent inside. Meanwhile, in each of Test Examples 4 to 6, 17, and 18 in which hydrothermal reactions were caused, the true specific gravity was lower than 2.3 g/cm$^3$, and voids that were not in communication with the outside were found to exist inside.

In each of the test samples in Test Examples 7 to 9 among the test samples having been subjected to hydrothermal reactions, the true specific gravity was 2.3 g/cm$^3$ which was equivalent to the value of particles having no voids. The reason for this is considered to be because, in each of these test samples, formed voids were in communication with the outside so that the true specific gravity became equal to the true specific gravity of silica, as is obvious also from the fact that the corresponding pore volume and specific surface area were large.

Presence/absence of voids (pores) in communication with the outside owing to a difference in the preparation condition may be checked also with an SEM photograph. Regarding the test sample in Test Example 3, as is obvious from FIG. 2, presence of voids (pores) in communication with the outside was not observed. Regarding the test sample in Test Example 6, as is obvious from FIG. 3, pores were found to be substantially absent as a whole although particles in which pores existed were contained. Meanwhile, regarding the test sample in Test Example 8, as is obvious from FIG. 4, the majority of particles was found to be particles in which pores existed.

That is, the test sample in Test Example 8 provided a finding that, although voids were formed inside in the same manner as in hollow particles, the voids were in communication with the outside so that the true specific gravity was equal to the true specific gravity of solid particles. Furthermore, although not described in detail, observation of a cross section of the test sample in Test Example 5 provided a finding that a large number of voids were formed like pores in a porous substance. Fine voids had such a tendency that the density became higher at a position closer to the center of the particle.

The reason why voids are formed inside by causing a hydrothermal reaction is inferred to be as follows. When a hydrothermal reaction is caused, water is slowly removed from outer parts at the time of conversion from the raw material silica particles the to spherical silica particles. Consequently, the outer sides of the particles come to be in a dense state. Then, water is removed from inner parts, and at this time, voids are formed inside. Meanwhile, in a case where the particles are rapidly heated and fired without undergoing any hydrothermal reaction, water is rapidly removed from the entire particles, and firing is performed, whereby solid particles having no voids therein are obtained.

The silicic acid contained in the raw material solution was found to be kept dissolved without being precipitated, when the relative permittivity of the mixed solvent of water and the organic solvent was set to 20 (Test Example 13). Therefore, the relative permittivity of the mixed solvent was found to need to be at least higher than 20.

Figure 8:
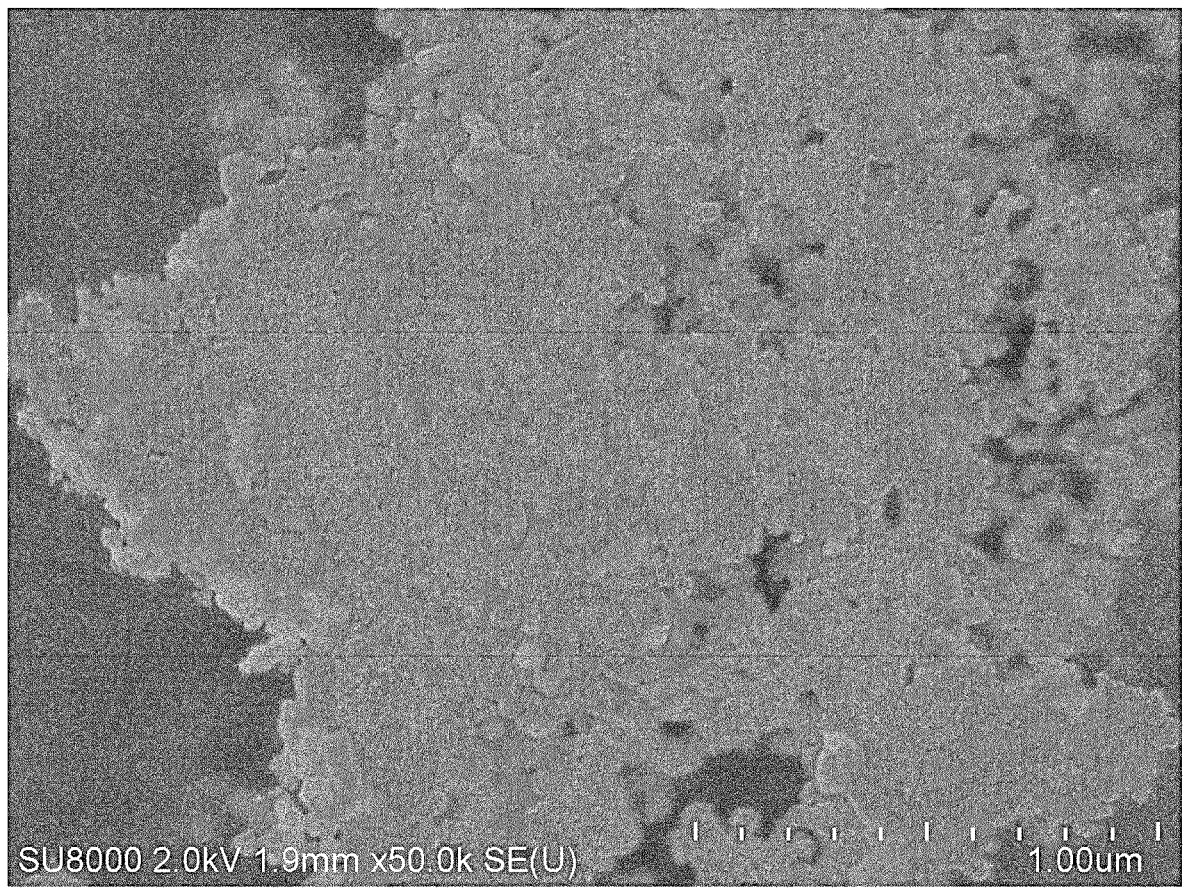
FIG. 8 is an SEM photograph of a test sample in Test Example 14 among the Examples.
Figure 9:
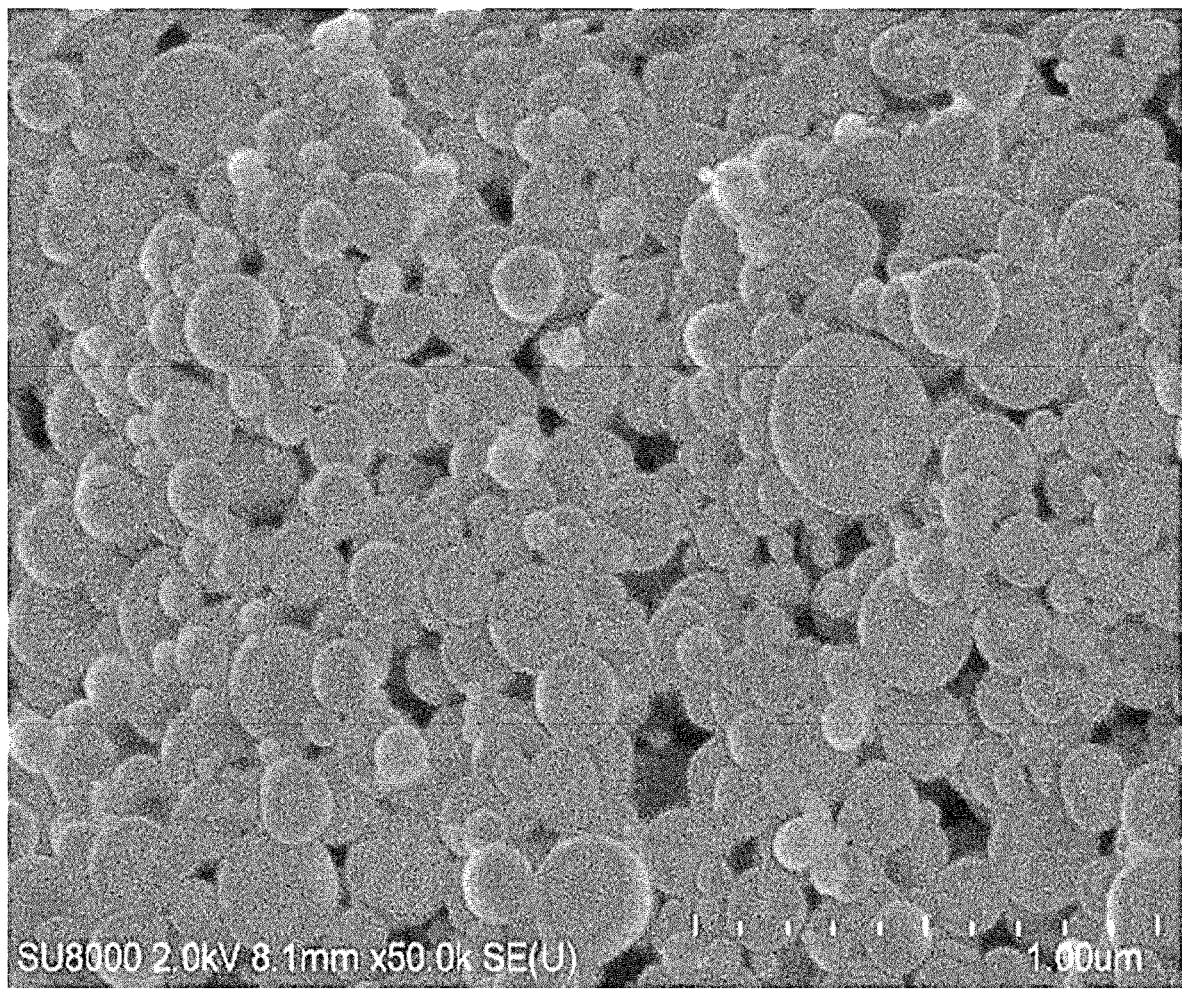
FIG. 9 is an SEM photograph of a test sample in Test Example 17 among the Examples.
Figure 10:
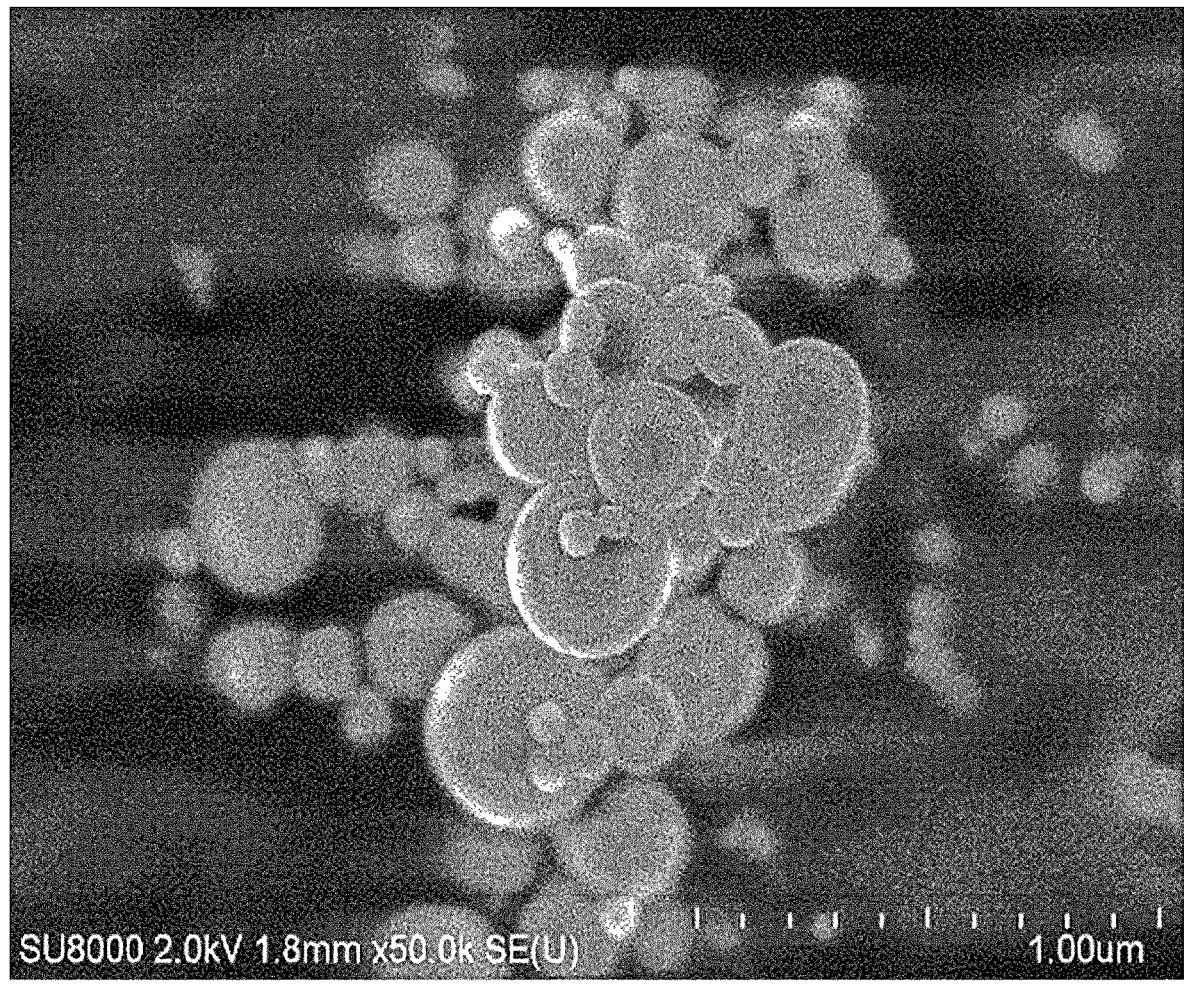
FIG. 10 is an SEM photograph of a test sample in Test Example 18 among the Examples.
Figure 11:
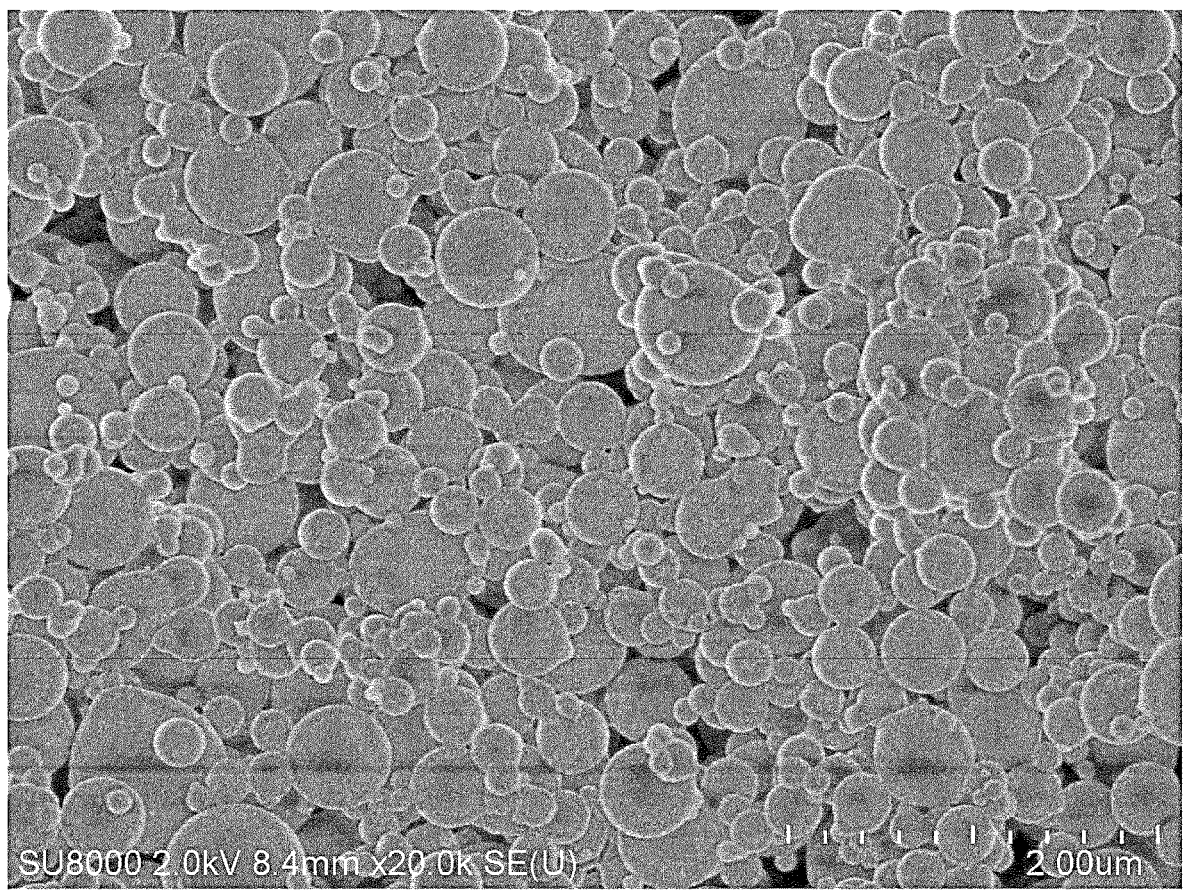
FIG. 11 is a cross-sectional SEM photograph of a test sample in Test Example 19 among the Examples.
Figure 12:
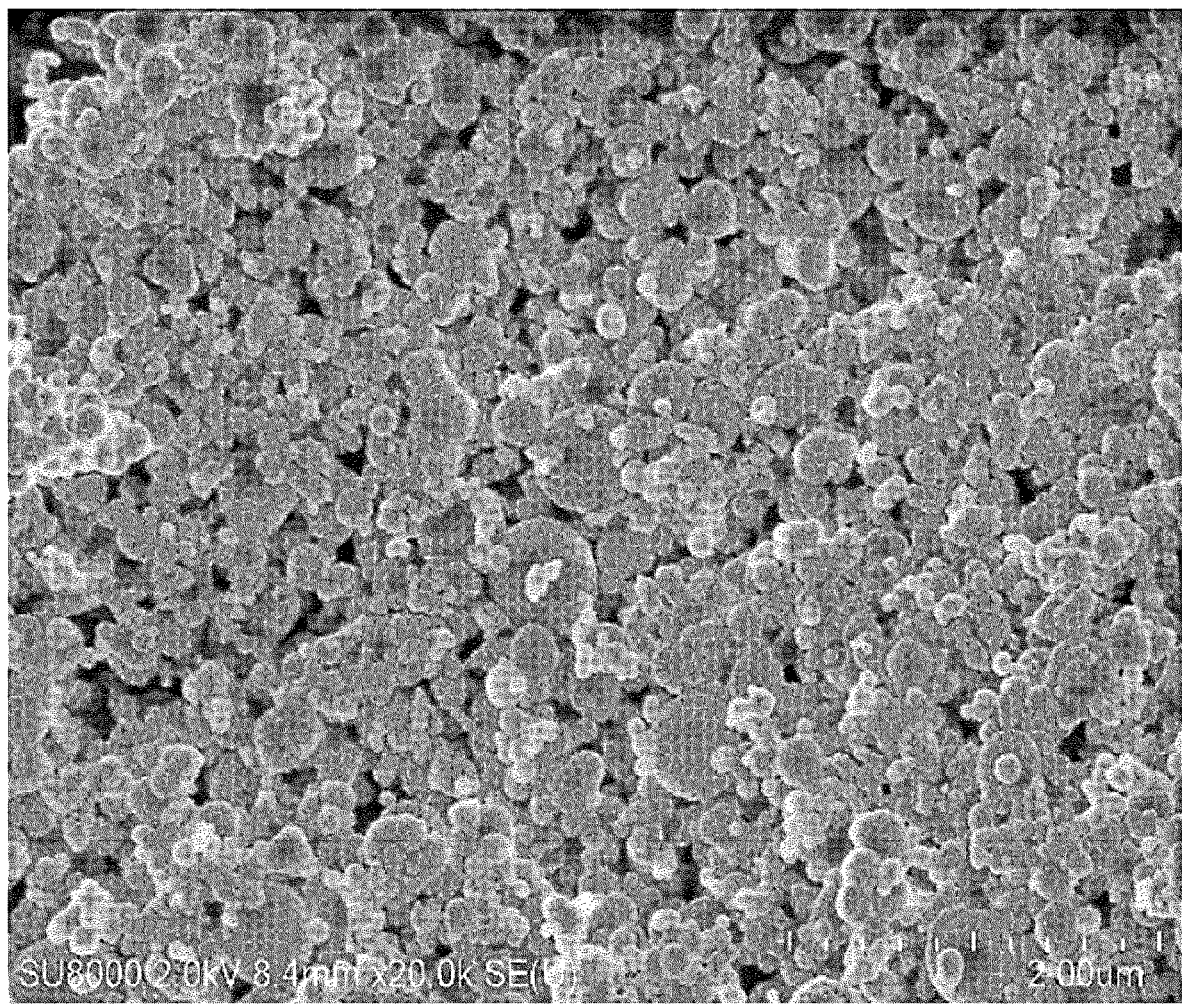
FIG. 12 is an SEM photograph of a test sample in Test Example 20 among the Examples.

When the relative permittivity of the mixed solvent of water and the organic solvent was set to 41.5 (Test Example 14), a fine aggregate of silica was merely formed without formation of particles at the time of precipitation of the silicic acid contained in the raw material solution (FIG. 8). Therefore, the relative permittivity of the mixed solvent was found to need to be at least lower than 41.5.

In Test Example 15 in which the addition amount of the basic substance was set to 0.20 in terms of molar ratio with respect to the silicon element derived from the silicic acid, a fine aggregate of silica was merely formed without formation of particles at the time of precipitation of the silicic acid contained in the raw material solution. Therefore, the addition amount of the basic substance was found to need to be higher than 0.20 in terms of molar ratio with respect to the silicon element derived from the silicic acid.

In Test Example 16 in which the addition amount of the basic substance was set to 0.85 in terms of molar ratio with respect to the silicon element derived from the silicic acid, the silicic acid contained in the raw material solution was found to be kept dissolved without being precipitated. Therefore, the addition amount of the basic substance was found to need to be lower than 0.85 in terms of molar ratio with respect to the silicon element derived from the silicic acid.

Spherical silica particles were found to be generated also in a case where DBU (Test Example 17), DBN (Test Example 18), TEAH (Test Example 19), or TBAOH (Test Example 20) was used as a basic substance instead of TMAH, in the same manner as in the case of TMAH (FIG. 9 to FIG. 12).

The results of the measurement of the numbers of coarse particles in Test Examples 3, 5, and 21 provided a finding that: the number of coarse particles among the spherical silica particles in Test Example 21 produced through the conventional VMC method was 2000 or more; and meanwhile, the numbers of coarse particles in Test Examples 3 and 5 were made very small and were respectively 5 and 36.

The results of the measurement of the contents of impurities in Test Examples 5 and 21 provided a finding that: the Th and U contents were decreased to be one-tenth or lower of the Th and U contents of the spherical silica particles in Test Example 21 produced through the conventional VMC method; and decrease of influence of x-rays at the time of utilization for an electronic device was made possible. In addition, the measured contents of the other elements substantially had a tendency to decrease as well. This is inferred to be because, in Test Example 5, impurities were not precipitated when the metal silicon powder was dissolved once, and then, precipitated.

(Other Tests)

In each of the above Test Examples, a metal silicon powder was used as a raw material for preparing an alkaline silicic acid aqueous solution. However, spherical silica particles were confirmed to be produced in the same manner also when silica particles or water glass (sodium silicate aqueous solution) was used instead of a metal silicon powder. After an alkaline silicic acid aqueous solution was prepared from each of materials which were silica and a sodium silicate aqueous solution, operations identical to the operations performed with the metal silicon powder were performed, whereby spherical silica particles equivalent to the spherical silica particles in which the metal silicon powder was used were obtained.

Method Including Using Silica Particles 20.0 g of a silica powder (product name: SO-E2 manufactured by ADMATECHS COMPANY LIMITED), 15.0 g of ion exchanged water, and 64.0 g of a 25%-by-mass TMAH aqueous solution were mixed, and the mixture was retained at 180° C. for 1 hour in a pressure container so as to dissolve the silica.

Consequently, an alkaline silicic acid aqueous solution containing about 20.2% of silicic acid on a silica basis was obtained.

Method Including Using Sodium Silicate Aqueous Solution 10.2 g of a sodium silicate aqueous solution (water glass) and 15.0 g of ion exchanged water were mixed, and the mixture was stirred at 40° C. for 4 hours. Thereafter, Na ions were removed through ion exchange while 64.0 g of a 25%-by-mass TMAH aqueous solution was being dripped. As a result, an alkaline silicic acid aqueous solution containing 10.8% by mass of silicic acid on a silica basis was obtained.

The invention claimed is:

1. A method for producing spherical silica particles, the method comprising:
  a raw material silica particle preparation step of preparing a liquid dispersion of raw material silica particles from a raw material solution obtained by dissolving silicic acid in a mixed solvent of water and an organic solvent in the presence of a basic substance formed from at least one of a quaternary ammonium and a base having a cyclic amidine structure; and
  a heating step of heating the liquid dispersion or the raw material silica particles obtained from the liquid dispersion through solid-liquid separation so as to remove an organic substance contained in the liquid dispersion, thereby preparing spherical silica particles, wherein
  the mixed solvent has a relative permittivity of 21 or higher and 40 or lower, and
  the basic substance is blended in a blending ratio of 0.3 or higher and 0.8 or lower in terms of molar ratio with respect to a silicon element derived from the silicic acid.

2. The method for producing spherical silica particles according to claim 1, wherein the organic solvent is at least one type of solvent selected from the group consisting of acetone, methyl ethyl ketone, and ethyl acetate.

3. The method for producing spherical silica particles according to claim 1, wherein the basic substance is at least one type of compound selected from the group consisting of quaternary ammoniums each having 4 to 16 carbon atoms, diazabicycloundecene, and diazabicyclononen.

4. The method for producing spherical silica particles according to claim 1, the method further comprising
   a raw material solution preparation step of adding the organic solvent and the basic substance to an alkaline silicic acid aqueous solution so as to obtain the blending ratio of the basic substance, the alkaline silicic acid aqueous solution being obtained through a method among
      a) heating and pressurizing silicon dioxide in an aqueous solution of the basic substance,
      b) removing Na ions from a sodium silicate aqueous solution in the presence of the basic substance, and
      c) dissolving a metal silicon in an aqueous solution containing the basic substance and/or a second basic substance, wherein
   the raw material solution is prepared through the raw material solution preparation step.

5. The method for producing spherical silica particles according to claim 1, wherein the raw material silica particle preparation step is a step of preparing the raw material silica particles with a pH of the raw material solution being adjusted to 7 or higher and 10 or lower.

6. The method for producing spherical silica particles according to claim 1, the method further comprising
   a hydrothermal treatment step of substituting, with water, a dispersion medium in which the raw material silica particles are dispersed, and then performing pressurization and heating to 130° C. or higher and 250° C. or lower, the hydrothermal treatment step being subsequent to the raw material silica particle preparation step and preceding the heating step, wherein
   the spherical silica particles produced in the heating step are hollow particles.

7. The method for producing spherical silica particles according to claim 6, wherein the heating step includes a step of performing the heating at 900° C. or higher.

* * * * *